(12) United States Patent
Miyaoh

(10) Patent No.: US 6,406,032 B1
(45) Date of Patent: Jun. 18, 2002

(54) CYLINDER HEAD GASKET WITH GAS RELEASING PORTION

(75) Inventor: Yoshio Miyaoh, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 30 days.

(21) Appl. No.: 09/655,448

(22) Filed: Sep. 5, 2000

(30) Foreign Application Priority Data

Sep. 8, 1999 (JP) .......................... 11-253882

(51) Int. Cl.[7] .................................................. F02F 11/00
(52) U.S. Cl. ...................................... 277/594; 277/597
(58) Field of Search ................................. 277/594, 597, 277/600

(56) References Cited

U.S. PATENT DOCUMENTS

| | | | |
|---|---|---|---|
| 4,272,085 A | * | 6/1981 | Fujikawa et al. |
| 5,385,354 A | * | 1/1995 | Hagiwara et al. |
| 5,685,547 A | * | 11/1997 | Jargeaix |
| 5,690,342 A | * | 11/1997 | Tanaka et al. |
| 5,951,021 A | * | 9/1999 | Ueta ........................... 277/593 |
| 6,076,833 A | * | 1/2000 | Geshi ........................... 277/595 |

FOREIGN PATENT DOCUMENTS

| | | | |
|---|---|---|---|
| DE | 1907682 | * | 8/1976 |
| JP | 9-292028 | * | 11/1997 |

* cited by examiner

Primary Examiner—Anthony Knight
Assistant Examiner—Alison K. Pickard
(74) Attorney, Agent, or Firm—Kanesaka & Takeuchi

(57) ABSTRACT

A cylinder head gasket is formed of a metal plate, cylinder bore sealing devices formed on the metal plate for sealing around cylinder bores, and at least one water hole sealing device formed on the metal plate. The water hole sealing device has an inner sealing portion extending along and outside the cylinder bore sealing devices to have a space thereto and extending outside the water holes on a side of the cylinder bores, and an outer sealing portion situated outside the water holes and extending along the inner sealing portion. The inner and outer sealing portions surround a plurality of water holes therein, and continuously extend to join together to have at least one gas releasing portion between end portions of the water hole sealing device. Thus, even if the combustion gas leaks from the cylinder bores, the gas can be prevented from entering the water holes.

8 Claims, 6 Drawing Sheets

Fig. 4(a) — Bore side / Outer side; labels Ha, 31a, 13, 31b, Hb, Wa, Wb

Fig. 4(b) — Bore side / Outer side; labels 32a, 13, 32b

Fig. 4(c) — Bore side / Outer side; labels 33a, 13, 33b

Fig. 4(d) — Bore side / Outer side; labels 34a, 13, 34b, 34

Fig. 4(e) — Bore side / Outer side; labels 35a, 13, 35b, 34', 35, 35'

Fig. 4(f) — Bore side / Outer side; labels 36a, 13, 36b, 36, 36'

Fig. 4(g) — Bore side / Outer side; labels 37a, 13, 37b, 38, 37, 39

CYLINDER HEAD GASKET WITH GAS RELEASING PORTION

BACKGROUND OF THE INVENTION AND RELATED ART STATEMENT

The present invention relates to a head gasket to be attached between two members, such as a cylinder head and a cylinder block, of an internal combustion engine, more specifically, a cylinder head gasket for a multi-cylinder semi-closed engine having a plurality of water holes and a gas releasing portion.

A cylinder head gasket to be applied to an engine for a vehicle includes a plurality of cylinder bores, water holes, oil holes, bolt holes and the like according to its use, and the holes to be sealed are provided with various sealing devices.

While the cylinder head gasket is manufactured according to a shape of a cylinder block, the cylinder block is classified into an open deck type cylinder block, a closed deck type cylinder block and a semi-closed deck type cylinder block according to a shape of a water jacket for cooling the cylinders.

The open deck type cylinder block includes openings for cooling water paths connected to a water jacket provided around each cylinder bore on a joining surface with a cylinder head. Thus, the open deck type cylinder block has a good cooling ability, can be made compact and easily manufactured.

On the other hand, the closed deck type cylinder block does not include the cooling water paths around the respective cylinder bores on the joining surface with the cylinder head, and the water jacket is closed on the joining surface of the cylinder block portion. Since the closed deck type cylinder block does not have openings, it is suitable for a high power engine because it has a high rigidity and less deformation. However, since there are no openings, its manufacture and processing are very complicated, which results in a high manufacturing cost.

In the semi-closed deck type cylinder block, an opening portion of the water jacket is partially closed, more specifically, an upper portion of the water jacket around the cylinder bore is partially closed in a circumferential direction of the cylinder bore to thereby obtain a rigidity of a cylinder. Also, since the semi-closed deck type cylinder block has openings for the cooling water paths connected to the water jacket, it has a good cooling ability and can be manufactured easily.

The cylinder head gasket of the present invention is used for the semi-closed deck type engine. In this engine, as shown in FIG. 5, water holes 33 as the openings for the cooling water paths connected to the water jacket are formed on both sides of the respective cylinder bores 32 in a circular arc shape on a joining surface 31 with the cylinder head on a side of the cylinder block 30 so as to intermittently surround the respective cylinder bores 32.

Therefore, as shown in FIG. 6, in a cylinder head gasket 40, water holes 43 in a shape of a circular arc are intermittently disposed around the respective cylinder bores 42 provided on a gasket plate 41. Sealing devices 52, 53, 55 are provided; around the cylinder bores 42, water holes 43 and oil holes 45 and the like to thereby obtain the respective sealing abilities.

However, when the engine is operated, a combustion gas having high pressure and temperature is generated in the cylinder bores and may damage cylinder bore sealing devices 52 formed of beads or the like provided around the cylinder bores 42. Further, since the engine vibrates, the cylinder head gasket 40 is repeatedly subjected to various deformations. Thus, the combustion gas may leak, in an extremely small amount, through the cylinder bore sealing devices 52 from the cylinder bores 42.

In case the combustion gas leaks, there is no gas releasing portion. Moreover, when the sealing ability of the water hole sealing devices 53 for the water holes 43 becomes insufficient due to their deterioration, the leaked gas flows into the water jacket through the water holes 43 to thereby cause a gas accumulation.

The gas accumulation may be very small, but the cooling water can not pass through the gas accumulated portion to cause a flow prevention by gas. As a result of the flow prevention by gas, a circulation of cooling water is limited and, in the worst case, an overheat may take place.

Also, in case the extremely small amount of the combustion gas leaks outside the gasket 40 from the cylinder bores 42 and contacts machineries of the engine itself and other parts around the engine, functions of the machineries and other parts may be deteriorated. Therefore, it is necessary to prevent the leaked gas from contacting the machineries and other parts. In the conventional gasket, it has been impossible to find out portions where the gas leaks.

In this respect, in Japanese Patent Publication (KOKAI) No. 11-108189, a plate for forming a gasket includes a bead surrounding an outer area of the gasket, wherein a part of the plate including the bead is notched to allow a leaked gas to escape therethrough. However, the leaked gas is not smoothly lead outside the gasket and may enter again into water or other holes.

Also, it is known to surround a water hole by a bead to seal therearound, which is disclosed in, such as Japanese Patent Publications No. 11-22827, No. 9-166218, No. 8-291865 and No. 7-229564. In these cases, the water hole or holes are simply surrounded by the bead for sealing.

In view of the above problems, the present invention has been made, and an object of the invention is to provide a cylinder head gasket to be applied to a semi-closed deck type engine, wherein gas leaked from cylinder bore sealing devices is guided outside the cylinder head gasket through a gas releasing portion so that even if the gas leaks from the cylinder bore sealing devices, the leaked gas is prevented from entering water holes.

Another object of the invention is to provide a cylinder head gasket as stated above, wherein the leaked gas is guided to one end side or both end sides of the cylinder head gasket in a longitudinal direction so that the leaked gas does not damage other machinery or device.

A still further object of the invention is to provide a cylinder head gasket as stated above, wherein a strength of a part of a water hole sealing device located on a side of the cylinder bore, i.e. on a side where the water hole sealing device is likely to contact the leaked combustion gas and to receive a high pressure, is formed stronger than that of a part of the water hole sealing device located outside the water holes, so that a sealing surface pressure can be made high to further prevent the leaked gas from entering into the water holes.

Further objects and advantages of the invention will be apparent from the following description of the invention.

SUMMARY OF THE INVENTION

A cylinder head gasket of the invention is used for a multi-cylinder semi-closed deck type engine, wherein a series of water holes are disposed around a plurality of cylinder bores. Cylinder bore sealing devices surround the cylinder bores to seal therearound.

According to a first aspect of the invention, a water hole sealing device is formed to seal a series of water holes disposed around the cylinder bore sealing devices by surrounding the same, and the water hole sealing device includes a gas releasing portion at a side of the cylinder bore sealing devices to communicate with an outside of the gasket to thereby release a gas slightly leaked from the cylinder bore sealing devices to an outside.

According to a second aspect of the invention, a series of water holes disposed around a plurality of cylinder bore sealing devices are divided into two groups. Each group of the water holes is surrounded by a first water hole sealing device, and a second water hole sealing device, respectively, So that two gas releasing portions are provided at both sides of the cylinder bore sealing devices. Thus, an inner side of the water hole sealing device communicates with an outside of the gasket, and the combustion gas slightly leaked from the cylinder bore sealing devices is released through the two gas releasing portions.

More specifically, one or two water hole sealing devices surround a plurality of the water holes to seal the same, and also, a cylinder bore side portion of the water hole sealing device is allowed to function as a guiding path of the combustion gas slightly leaked from the cylinder bore sealing devices, so that the leaked combustion gas is released outside the gasket through the gas releasing portion or portions of the water hole sealing device or devices.

Therefore, since the combustion gas slightly leaked from the cylinder bore sealing devices can be guided along the water hole sealing device or devices on the cylinder bore side to discharge the gas through the gas releasing portion or portions, the leaked combustion gas is prevented from flowing into a cooling water in a water jacket through the water holes by passing the water hole sealing device or devices.

According to a third aspect of the invention, in the cylinder head gasket, the gas releasing portion is disposed on an end side of the cylinder head gasket in the longitudinal direction.

More specifically, in case the two, i.e. first and second, water hole sealing devices are used, the two water hole sealing devices are disposed on both sides of a line connecting centers of the respective cylinder bores of the cylinder head gasket. The first water hole sealing device continuously seals the water holes disposed on one side of the cylinder bores, and the second water hole sealing device continuously seals the water holes disposed on the other side of the cylinder bores.

Since the leaked gas is guided to both end sides of the cylinder head gasket in the longitudinal direction, influence of the leaked gas can be reduced. Also, when the cylinder head is tightened by bolts, since tightening pressures on both end sides of the cylinder head gasket in the longitudinal direction are not so strong, the end sides are suitable as the gas releasing paths.

According to a fourth aspect of the invention, in the cylinder head gasket, the water hole sealing device is formed of a half bead or a full bead.

The water hole sealing device may be formed of a known device, but the water hole sealing device can be easily formed of a bead. Although a space between the water hole and the cylinder bore is narrow, it is necessary to provide the cylinder bore sealing device and the water hole sealing device therein. Thus, it is preferable that the water hole sealing device is formed of a half bead.

According to a fifth aspect of the invention, in the cylinder head gasket, a strength of a bead as the water hole sealing device on a side of the cylinder bore is made stronger than that of a bead outside the water hole.

Thus, the strength of the bead on the side subjected to the high temperature combustion gas and high pressure is made strong and a high surface pressure can be held to thereby effectively guide the leaked gas outside.

The strength of the bead can be easily varied by changing a width or height of the bead.

BRIEF DESCRIPTION OF THE DRAWINGS

FIG. 4(a) is a partial sectional view similar to FIG. 3, wherein full beads are used;

FIGS. 4(b) and 4(c) are partial sectional views similar to FIG. 3, wherein a combination of a full bead and a half bead is used;

FIGS. 4(d), 4(e) and 4(f) are partial sectional views similar to FIG. 3, wherein two metal plates with beads are used;

FIG. 4(g) is a partial sectional view similar to FIG. 3, wherein a plate with beads is sandwiched between two plates;

DETAILED DESCRIPTION OF PREFERRED EMBODIMENTS

With reference to the accompanying drawings, embodiments of a cylinder head gasket according to the present invention will be explained.

Figure 5:
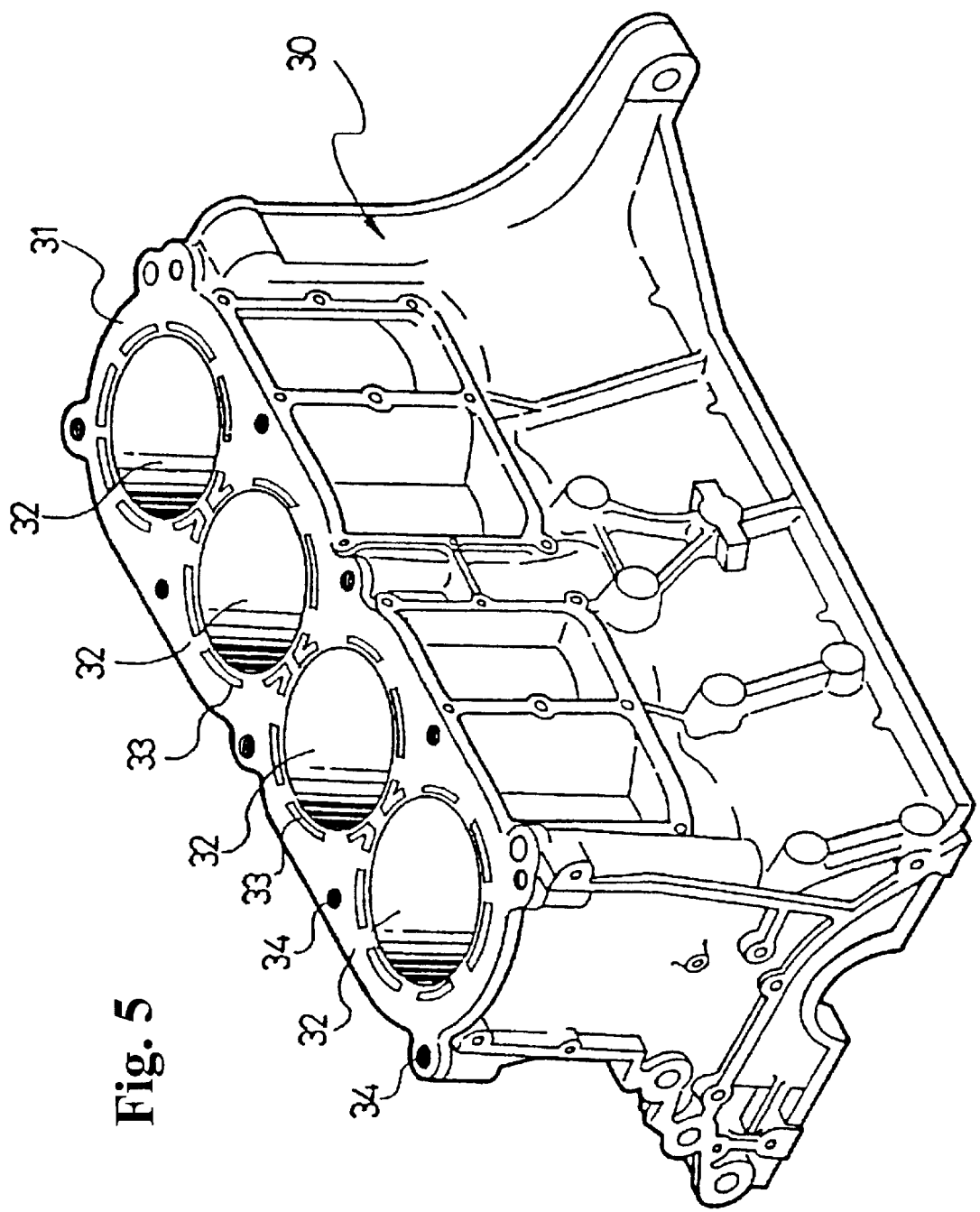
FIG. 5 is a perspective view showing a semi-closed deck-type cylinder block.
Figure 6:
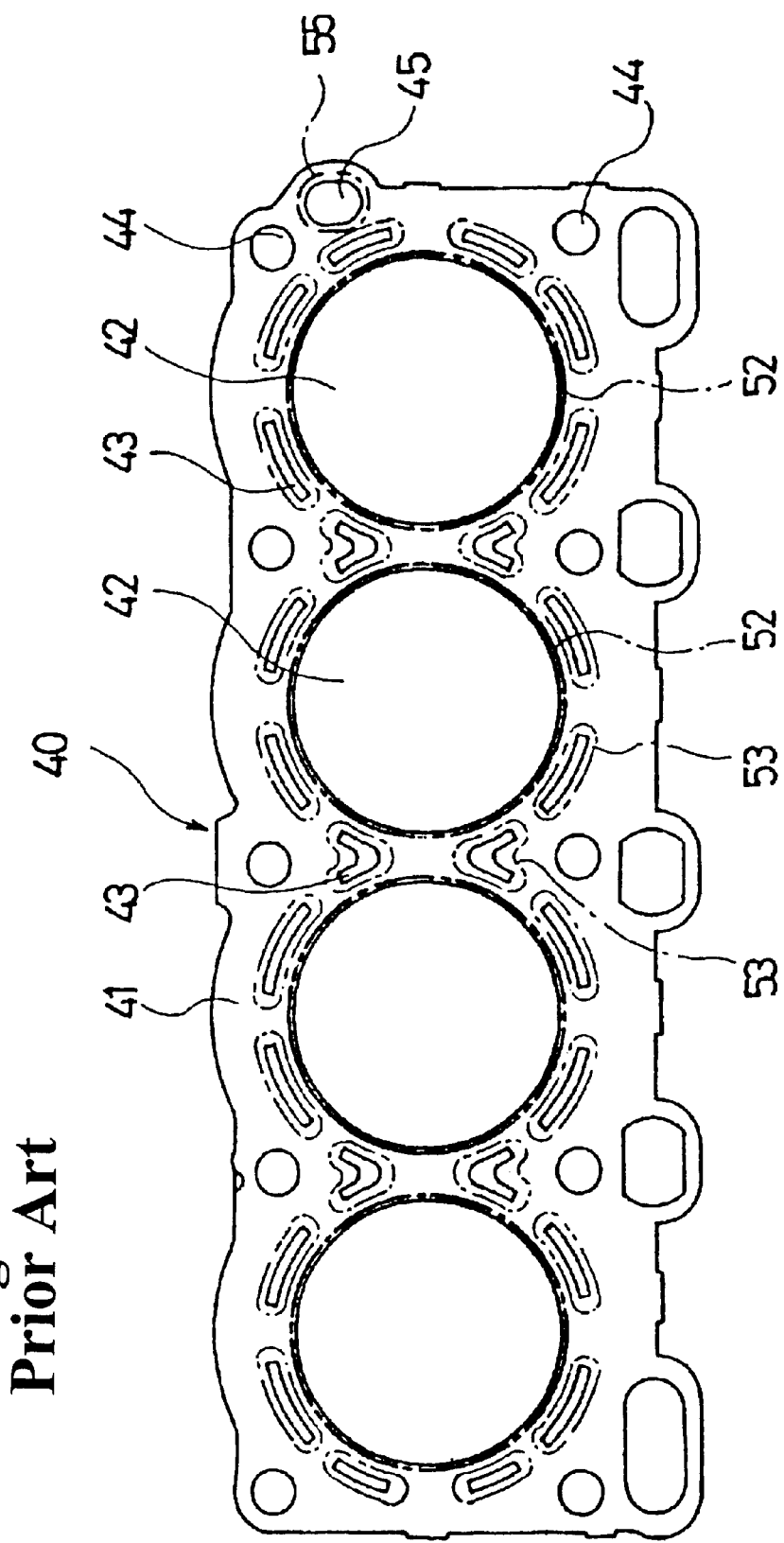
FIG. 6 is a plan view showing a conventional cylinder head gasket.

As shown in FIG. 5, a multi-cylinder semi-closed deck type cylinder block 30, to which a cylinder head gasket according to the present invention is applied, includes a plurality of water holes 33 in a shape of a circular arc communicating with a water jacket and a plurality of bolt holes 34 for tightening around a plurality of cylinder bores 32.

Figure 1:
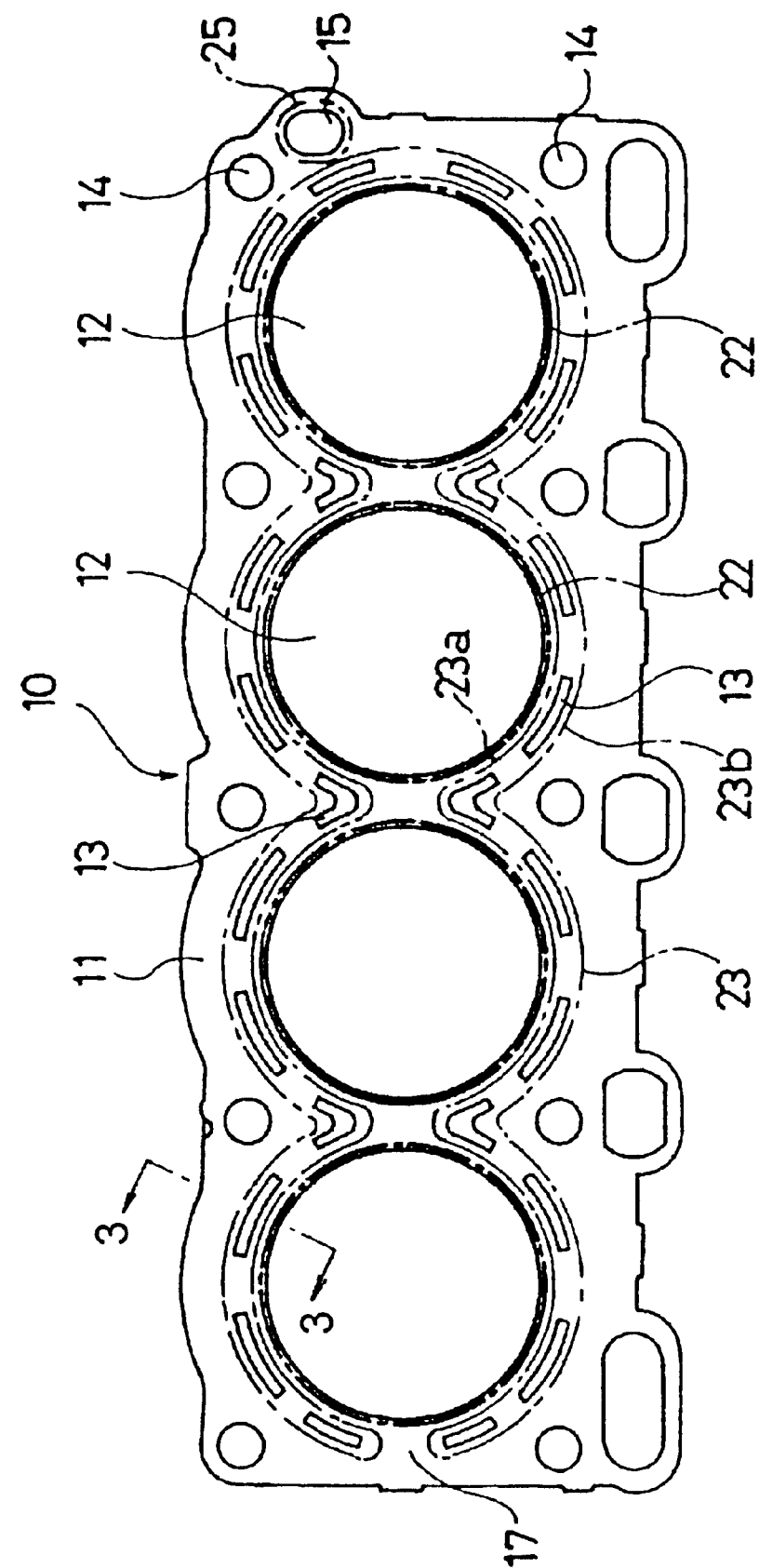
FIG. 1 is a plan view of a cylinder head gasket showing a first embodiment according to the present invention.

A cylinder head gasket 10 of a first embodiment according to the present invention, as shown in FIG. 1, is formed of one metal plate 11. The metal plate 11 includes a sealing device 22, such as a bead or grommet which is known in the art, for sealing around each cylinder bore 12 provided on the gasket plate 11.

A continuous water hole sealing device 23 surrounds a plurality of water holes 13 in a shape of a circular arc disposed outside the respective sealing devices 22.

The water hole sealing device 23 surrounds the cylinder bores 12 as well as the water holes 13. However, the water hole sealing device 23 does not completely surround the whole circumference of all the cylinder bores 12 to provide a gas releasing portion 17, wherein a side of the cylinder bores 12 communicates with an outer side of the gasket 10.

Since tightening pressures when a cylinder head is tightened by bolts are generally weak at both end portions of a cylinder head gasket 10 in a longitudinal direction, it is preferable to provide the gas releasing portion 17 at the end portion.

According to the structure, a water hole sealing device 23a provided on a side of the cylinder bores 12 and a water hole sealing device 23b provided on an outer side of the water holes are connected at two points to thereby constitute a continuous water hole sealing device 23.

Figure 2:
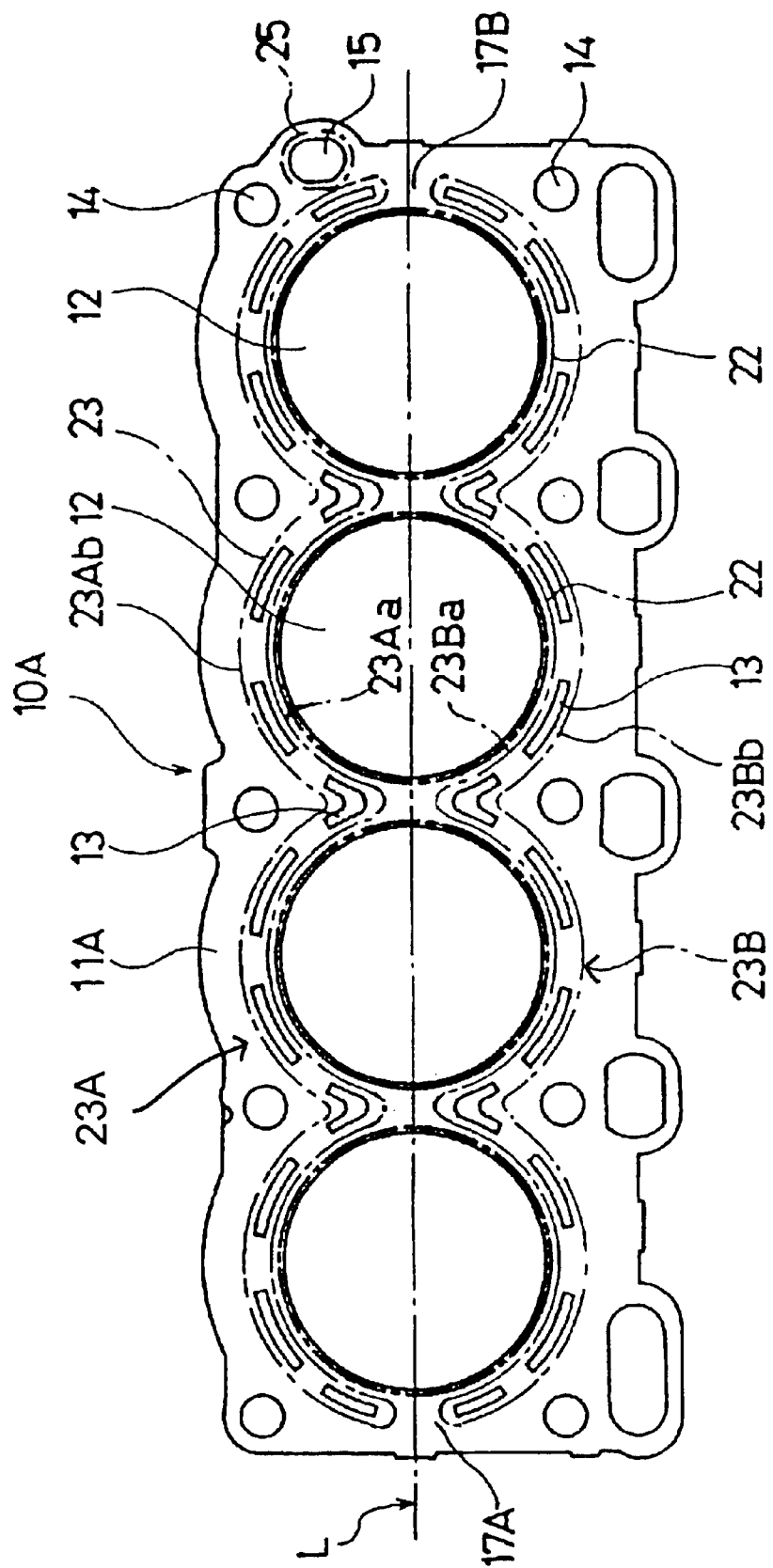
FIG. 2 is a plan view of a cylinder head gasket showing a second embodiment according to the present invention.

In a second embodiment of a cylinder head gasket according to the present invention, as shown in FIG. 2, two continuous water hole sealing devices 23A, 23B surround a plurality of water holes 13 disposed around the cylinder bores 12.

More specifically, the water holes 13 disposed around the respective cylinder bores 12 are divided into two groups located on both sides with respect to a straight line L connecting centers of the cylinder bores 12. A first water hole sealing device 23A is formed to seal all the water holes 13 disposed on one side of the straight line L, and a second water hole sealing device 23B is formed to seal all the water holes 13 disposed on the other side of the straight line L.

Thus, the first water hole sealing device 23A and the second water hole sealing device 23B are located on both sides of the straight line L.

The first water hole sealing device 23A and the second water hole sealing device 23B surround the cylinder bores 12 as well as the water holes 13. However, the first water hole sealing device 23A and the second water hole sealing device 23B do not surround the whole circumference of all the cylinder bores 12, and end apportions of the first water hole sealing device 23A and end portions of the second water hole sealing device 23B, which face each other at two points, constitute gas releasing portions 17A and 17B. The gas releasing portions 17A, 17B allow spaces between the water holes and the cylinder bores to communicate with an outer side of a gasket 10A to release the combustion gas slightly leaked from the cylinder bores 12 to the outside of the gasket 10A.

When a cylinder head is tightened by bolts, tightening pressures applied to both end sides of the cylinder head gasket 10A in a longitudinal direction are generally small. Thus, it is preferable to provide the gas releasing portions 17A, 17B on both end sides.

As the water hole sealing devices 23, 23A, 23B to be used in the gaskets 10 and 10A according to the first and second embodiments, as shown in FIGS. 3 and 4(a) through 4(g), known sealing devices, such as half beads 23a, 23b (FIG. 3) and full beads 31a, 31b (FIG. 4(a)), and a combination thereof can be employed. Since the half beads 23a, 23b can be easily formed at a narrow space, when the half beads 23a, 23b are used, the gasket can be applied to even a compact engine.

In particular, in FIG. 4(b), a half bead 32a at a bore side and a full bead 32b at an outer side are used. In FIG. 4(c), a full bead 33a at a bore side and a half bead 33b at an outer side are used. In FIG. 4(d), two plates 34, 34' include half beads 34a, 34b, respectively. In FIG. 4(e), two plates 35, 35' include full beads 35a, 35b, respectively. In FIG. 4(f), two plates 36, 36' include full beads 36a at the bore side and half beads 36b at the outer side, respectively.

According to a structure as shown in FIG. 4(g), plates 38, 39 are laminated on a plate 37 with beads 37a, 37b. Also, the plate may be laminated on one side, or a plurality of plates may be laminated.

Figure 3:
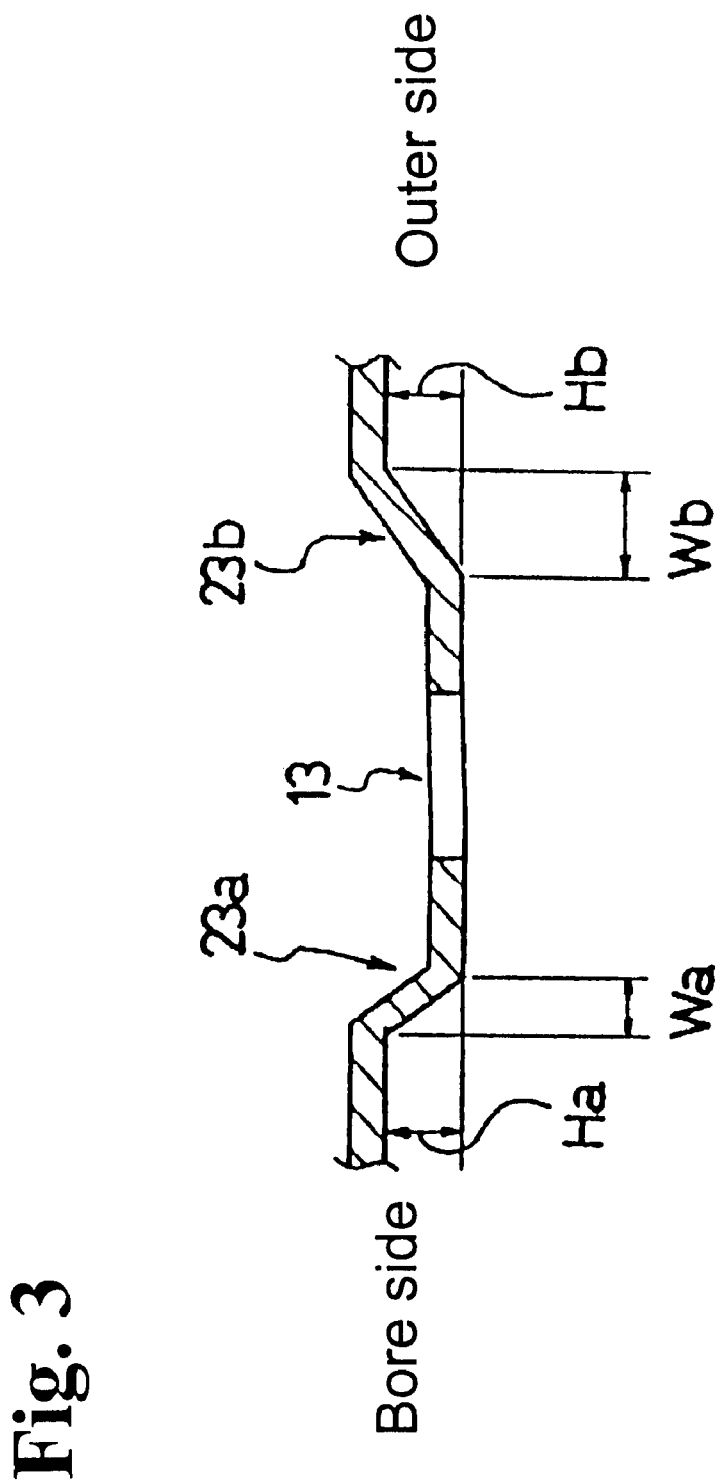
FIG. 3 is a partial section view taken along line 3—3 in FIG. 1.

A strength, i.e. rigidity, of the water hole sealing device 23, 23A or 23B formed of the half bead or the full bead on the side of the cylinder bores 12 is made stronger than that of the water hole sealing device on the outside of the water holes. The strengths can be changed by making a width Wa of the bead 23a on the side of the cylinder bores 12 narrower than a width Wb of the bead 23b outside the water holes, or by making a height Ha of the bead 23a on the side of the cylinder bores 12 higher than a height Hb of the bead 23b outside the water holes, as shown in FIG. 3.

According to the gaskets 10, 10A having the structures as described above, the following effects can be obtained.

A plurality of water holes 13 is surrounded by the water hole sealing device 23 or devices 23A and 23B to thereby seal the water holes 13. At the same time, the combustion gas leaked through the respective cylinder bore sealing devices 22 is guided to the gas releasing portion 17 or the gas releasing portions 17A, 17B along a portion 23a, 23Aa, 23Ba on the side of the cylinder bores 12 of the water hole sealing device 23 or water hole sealing devices 23A, 23B to thereby lead the leaked gas outside the cylinder head gasket 10 or 10A. Thus, the leaked gas is prevented from flowing into a cooling water in a water jacket through the water holes 13.

Also, since the leaked gas is guided to one or both end sides of the cylinder head gasket 10 or 10A in the longitudinal direction, a risk of the leaked gas damaging the other machinery or parts can be reduced.

Further, since the strength of the bead on the cylinder bore side of the water hole sealing portion 23a or portions 23Aa, 23Ba, is made stronger than that on outer bead 23b or outer beads 23Ab, 23Bb, a sealing surface pressure on the side which is subjected to a high temperature combustion gas and high pressure can be held higher to thereby prevent the leaked gas from entering the water holes 13.

As described hereinabove, according to the present invention, the following effects can be obtained.

A plurality of water holes is surrounded by a water hole sealing device or devices to seal the water holes, and at the same time, a combustion gas leaked from cylinder bore sealing portions in an extremely small amount is guided to a gas releasing portion or portions along a portion or portions on a cylinder bore side of the water hole sealing device or devices to thereby lead the leaked gas outside a cylinder head gasket. Thus, the leaked gas is prevented from entering a cooling water in a water jacket through the water holes to thereby cool an engine in a good condition.

Since a leaked gas can be guided to one end side or both end sides of the cylinder head gasket in the longitudinal direction, the leaked gas does not damage the other machinery or device.

Since the strength of the bead on the cylinder bore side, which is subjected to high temperature combustion gas and high pressure, is made stronger than that of the bead outside thereof, the surface pressure for sealing can be held high to thereby prevent the leaked gas from entering the water holes.

While the invention has been explained with reference to the specific embodiments of the invention, the explanation is illustrative, and the invention is limited only by the appended claims.

What is claimed is:

1. A cylinder head gasket for an internal combustion engine, comprising:

a metal plate extending substantially throughout an entire area to be sealed, and including a plurality of cylinder bores arranged linearly along a longitudinal direction, and a plurality of water holes situated outside the cylinder bores to surround the same, cylinder bore sealing means formed on the metal plate for sealing around the cylinder bores, at least one water hole sealing means formed on the metal plate, and having an inner sealing portion extending along and outside the cylinder bore sealing means to have a space thereto and extending outside the water holes on a side of the cylinder bores, and an outer sealing portion situated outside the water holes and extending along the inner sealing portion, said inner and outer sealing portions surrounding a plurality of water holes therein and continuously extending and joined together to have at least one gas releasing portion between end portions of the at least one water hole sealing means, and means for leading a leaked gas from the gas releasing portion to an outside of the metal plate on the metal plate so that the leaked gas passing over the cylinder bore sealing means is lead along the inner sealing portion to the outside of the metal plate through the at least one gas releasing portion.

2. A cylinder head gasket according to claim 1, wherein said inner and outer sealing portions completely surround therebetween only water holes and parts of the metal plate.

3. A cylinder head gasket according to claim 2, wherein said inner and outer sealing portions have two connecting portions facing each other at the end portions to form the at least one gas releasing portion between the two connecting portions.

4. A cylinder head gasket according to claim 1, wherein said means for leading the leaked gas is a space on a surface of the metal plate communicating with the gas releasing portion.

5. A cylinder head gasket for an internal combustion engine, comprising:

a metal plate extending substantially throughout an entire area to be sealed, and including a plurality of cylinder bores arranged linearly along a longitudinal direction, and a plurality of water holes situated outside the cylinder bores to surround the same, cylinder bore sealing means formed on the metal plate for sealing around the cylinder bores, and at least one water hole sealing means formed on the metal plate, and having an inner sealing portion extending along and outside the cylinder bore sealing means to have a space thereto and extending outside the water holes on a side of the cylinder bores, and an outer sealing portion situated outside the water holes and extending along the inner sealing portion, said inner and outer sealing portions completely surrounding therebetween only a plurality of water holes and parts of the metal plate therein and continuously extending and joined together to have two gas releasing portions, said at least one water hole sealing means including first and second sealing portions, each having two connecting portions of the inner and outer sealing portions, the connecting portions of the first sealing portion facing the connecting portions of the second sealing portion to form the two gas releasing portions between the connecting portions facing each other.

6. A cylinder head gasket according to claim 5, wherein said connecting portions are located at longitudinal ends of the gasket to form the gas releasing portions at the longitudinal ends.

7. A cylinder head gasket according to claim 6, wherein said at least one water hole sealing means is formed of a bead selected from a full bead and a half bead.

8. A cylinder head gasket for an internal combustion engine, comprising:

a metal plate extending substantially throughout an entire area to be sealed, and including a plurality of cylinder bores arranged linearly along a longitudinal direction, and a plurality of water holes situated outside the cylinder bores to surround the same, cylinder bore sealing means formed on the metal plate for sealing around the cylinder bores, at least one water hole sealing means formed on the metal plate, and having an inner sealing portion extending along and outside the cylinder bore sealing means to have a space thereto and extending outside the water holes on a side of the cylinder bores, and an outer sealing portion situated outside the water holes and extending along the inner sealing portion, said inner and outer sealing portions completely surrounding therebetween only a plurality of water holes and parts of the metal plate therein and continuously extending and joined together to have at least one gas releasing portion between end portions of the at least one water hole sealing means, and at least one second metal plate to constitute a metal laminate gasket.

* * * * *

UNITED STATES PATENT AND TRADEMARK OFFICE
CERTIFICATE OF CORRECTION

PATENT NO.    : 6,406,032 B1  
DATED         : June 18, 2002  
INVENTOR(S)   : Yoshio Miyaoh It is certified that error appears in the above-identified patent and that said Letters Patent is hereby corrected as shown below:

Column 1,  
Line 61, delete ";";

Column 3,  
Line 17, change "So" to -- so --;

Column 5,  
Line 6, delete "23";  
Line 7, change "aprovided" to -- 23a provided --; and Column 7,  
Line 21, change "lead" to -- led --.

Signed and Sealed this

Twenty-second Day of October, 2002

Attest:

Attesting Officer

JAMES E. ROGAN  
Director of the United States Patent and Trademark Office